(12) United States Patent
Chang

(10) Patent No.: US 10,901,344 B2
(45) Date of Patent: Jan. 26, 2021

(54) BINARY INK DEVELOPER (BID) ASSEMBLY FOR LIQUID ELECTROPHOTOGRAPHY (LEP) PRINTING DEVICE

(71) Applicant: HEWLETT-PACKARD DEVELOPMENT COMPANY, L.P., Spring, TX (US)

(72) Inventor: Seongsik Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/598,120

(22) Filed: Oct. 10, 2019

(65) Prior Publication Data

US 2020/0041933 A1 Feb. 6, 2020

Related U.S. Application Data

(63) Continuation of application No. 16/076,342, filed as application No. PCT/US2017/015849 on Jan. 31, 2017, now Pat. No. 10,459,372.

(51) Int. Cl.
| | |
|---|---|
| *G03G 15/10* | (2006.01) |
| *G03G 15/11* | (2006.01) |
| *C09D 11/02* | (2014.01) |
| *G03G 9/00* | (2006.01) |

(52) U.S. Cl.
CPC .......... *G03G 15/104* (2013.01); *C09D 11/02* (2013.01); *G03G 9/00* (2013.01); *G03G 15/10* (2013.01); *G03G 15/11* (2013.01); *G03G 2215/0634* (2013.01)

(58) Field of Classification Search
None
See application file for complete search history.

(56) References Cited

U.S. PATENT DOCUMENTS

| | | |
|---|---|---|
| 5,543,902 A | 8/1996 | Takeda |
| 7,215,911 B2 | 5/2007 | Kim |
| 7,480,475 B2 | 1/2009 | Miyoshi |
| (Continued) | | |

FOREIGN PATENT DOCUMENTS

| | | |
|---|---|---|
| CN | 1073464 | 6/1993 |
| CN | 1179562 | 4/1998 |
| (Continued) | | |

OTHER PUBLICATIONS

Tagansky et al., "HP-Indigo Technology and its Application to Photo Printing", International Symposium on Technologies for Digital Photo Fulfillment, vol. 2012, No. 1, pp. 31-34. Society for Imaging Science and Technology, 2012.

*Primary Examiner* — Victor Verbitsky
(74) *Attorney, Agent, or Firm* — Michael A Dryja

(57) ABSTRACT

A binary ink developer (BID) assembly for a liquid electrophotography (LEP) printing device can include a developer roller having an electrically insulating exterior coating that receives ink from an ink supply and transfers the received ink to a photoconductive imaging cylinder in accordance with an electrostatic image on the imaging cylinder. A charge-specified boundary condition can exist at the boundary between the exterior coating and the ink. Electrically conductive ink may not be transferred to the imaging cylinder at background portions of the electrostatic image.

20 Claims, 7 Drawing Sheets

(56) References Cited

U.S. PATENT DOCUMENTS

| | | | |
|---|---|---|---|
| 7,734,244 B2* | 6/2010 | Yu | ................... G03G 15/6558 |
| | | | 399/390 |
| 7,970,323 B2 | 6/2011 | Katoh | |
| 8,679,370 B2 | 3/2014 | Jansen | |
| 8,750,763 B2 | 6/2014 | Martinkovic | |
| 9,248,641 B2* | 2/2016 | Gilan | ................... G03G 15/16 |
| 2008/0202369 A1 | 8/2008 | Yu | |
| 2014/0363764 A1 | 12/2014 | Yoshida | |
| 2015/0016846 A1 | 1/2015 | Grinwald | |
| 2016/0124349 A1 | 5/2016 | Gilan | |

FOREIGN PATENT DOCUMENTS

| | | |
|---|---|---|
| CN | 1955857 | 5/2007 |
| CN | 104823115 | 8/2015 |
| EP | 2296900 B1 | 9/2014 |
| WO | WO-2017174124 | 10/2017 |

* cited by examiner

BINARY INK DEVELOPER (BID) ASSEMBLY FOR LIQUID ELECTROPHOTOGRAPHY (LEP) PRINTING DEVICE

CROSS-REFERENCE TO RELATED APPLICATIONS

This application is a Continuation of U.S. patent application Ser. No. 16/076,342, entitled "BINARY INK DEVELOPER (BID) ASSEMBLY FOR LIQUID ELECTROPHOTOGRAPHY (LEP) PRINTING DEVICE", filed Aug. 8, 2018, which is a 371 National Phase Application of PCT Application No. PCT/US2017/015849, entitled "BINARY INK DEVELOPER (BID) ASSEMBLY FOR LIQUID ELECTROPHOTOGRAPHY (LEP) PRINTING DEVICE", filed Jan. 31, 2017, both of which are incorporated herein by reference.

BACKGROUND

Printing devices, like printers, use various technologies to output colorant, such as toner or ink, onto media like paper. Electrophotography is a printing technique first employed by laser printers, in which toner is applied to a drum in accordance with an electrostatic image that has been formed on the drum, and then subsequently transferred to a medium. More recently, electrophotography has been leveraged for use with liquid ink, in a process referred to as liquid electrophotography (LEP). LEP technology can equal or exceed the print quality of conventional offset lithographic and flexographic printing processes.

DETAILED DESCRIPTION

Figure 1:
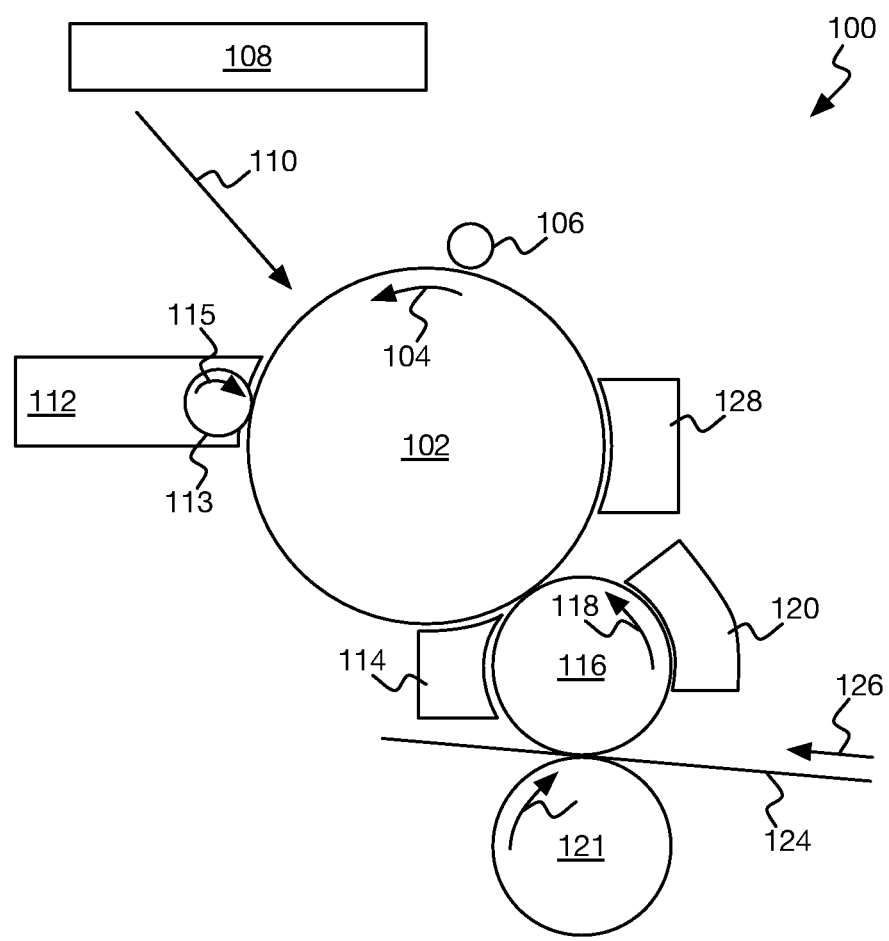
FIG. 1 is a diagram of an example liquid electrophotography (LEP) printing device.

As noted in the background, liquid electrophotography (LEP) is a printing technology that employs liquid ink instead of (typically dry) toner as in laser printing and other conventional electrophotography technologies. In an LEP printing device, electrically charged liquid ink is transferred to a roller assembly referred to as a binary ink developer (BID) assembly, which includes a developer roller and which increases the concentration of solids such as resin and pigments within the liquid ink. From the BID assembly, the ink is transferred to a photoconductive imaging cylinder, referred to as a print-imaging plate (PIP), in accordance with an electrostatic latent image on the cylinder. Unlike as in other electrophotography technologies, the ink is then transferred from the PIP to a heated blanket cylinder, or warming blanket, which evaporates carrier liquids and transforms the liquid ink into a hot melt, which is almost 100% solid, before the ink is finally transferred to media being advanced via an impression drum.

The liquid ink is negatively charged prior to the BID assembly and BID assembly increases the solid concentration of the ink. The PIP is also negatively charged, but more so than the ink, and is selectively discharged in accordance with the image to be formed on a medium. The liquid ink is thus attracted to areas of the PIP that have been selectively discharged, while being repelled from those areas that have not. In this way, the liquid ink is transferred to the PIP in accordance with the image to be formed on a medium.

Traditionally the liquid ink has itself been non-conductive. The pigments in the ink that ultimately are transferred to a medium may be those that correspond to color components that permit a full color image to be created on the medium. For instance, the different colors may be cyan, magenta, yellow, and black, or cyan, light cyan, magenta, light magenta, yellow, and black to provide more accurate color rendition.

However, more recently there has been interest in using liquid inks within LEP printing devices that are conductive. Such conductive inks can provide for a "metallic-look" finishing effect on the printed images. Conductive inks can themselves be metallic, to permit the printing of radio frequency identification (RFID) tags, anti-theft tags, security tags, and so on.

Unfortunately, conductive inks can result in print artifacts when used within existing LEP printing devices. Unwanted ink transfer to the background portions of an image—to which ink is not supposed to be transferred—can occur between the developer roller of the BID assembly and the PIP. Ghosting artifacts, which are images formed on prior rotations of the developer roller appearing in the next rotation of the developer roller, can also occur when ink charges are not completely removed during subsequent cleaning of the roller.

Such print artifacts result due to how a BID assembly conventionally operates. The developer roller is biased with a specific voltage, such as −450 volts, and has compacted negatively charged ink on its exterior surface. When the developer roller meets the PIP, which is itself biased at a lower voltage, such as −1,000 volts at background portions of the image, a positive charge is induced at the exterior surface of the developer roller to satisfy an electrostatic voltage boundary condition of the developer roller. Because conductive inks are just that—electrically conductive—this positive charge can bleed into the ink, resulting in changes in ink polarity from negative to positive. For a given electric field configuration, such ink polarity changes can cause transfer of the ink to the PIP at background portions of the image, instead of staying on the developer roller. Stated another way, biasing the developer roller at a specific voltage can induce positive charges that bleed into the ink and change its polarity, causing transfer of conductive ink onto the PIP even at background portions of the image.

Techniques disclosed herein mitigate and can even eliminate such print artifacts within LEP printing devices with conductive inks. A developer roller can include an electrically insulating exterior coating surrounding an electrically conductive rubber roller, which itself can include a conductive metal core. Rather than biasing the developer roller at a specific voltage, which can induce positive charges on the exterior surface of the developer roller, the techniques described herein place negative charges on the exterior surface of the assembly to negatively charge the ink. No positive charge can bleed into the ink, because there is no positive charge on the developer roller. No ink polarity changes occur that can cause transfer of conductive ink onto the PIP at background portions of the image, mitigating if not eliminating print artifacts that result from such an electric field.

FIG. 1 shows an example LEP printing device 100. The printing device 100 includes a PIP 102, which is more generally a photoconductive imaging cylinder. The PIP 102 rotates counterclockwise as indicated by arrow 104. The PIP 102 rotates past a charge roller 106 of the printing device 100, which negatively charges the PIP 102. A laser 108 or other discharge mechanism of the printing device 100 selectively discharges the PIP 102 via a laser beam 110 or other optical beam, in accordance with an image to be formed on a print medium like paper, as the PIP 102 rotates past the laser beam 110 and the laser 110 beam is normal to the PIP 102. Therefore, an electrostatic latent image is formed on the PIP 102.

The LEP printing device 100 includes a BID assembly 112. There can be more than one BID assembly 112, rotationally arranged the PIP 102 counterclockwise from the depicted BID assembly 112 in FIG. 1. Each BID assembly 112 corresponds to a different color or type of ink. The BID assembly 112 includes a developer roller 113 rotating clockwise as indicated by arrow 115 to transfer electrically charged liquid ink onto the PIP 102 in accordance with the electrostatic image on the PIP 102 by the laser beam 110 of the laser 108. That is, where the image is to be formed on a print medium, which is an image portion of the image, the ink is electrically attracted to the PIP 102, and is not electrically attracted to the PIP 102 where the image is not to be formed on the medium, which is a background portion of the image.

The PIP 102 rotates past a pre-transfer discharge unit 114 of the LEP printing device 100, which electrically discharges remaining charge corresponding to the background portion of the prior electrostatic image on the PIP 102. The printing device 100 includes a blanket 116, which is also referred to as a blanket cylinder, which rotates counterclockwise as indicated by the arrow 118. The blanket 116 rotates past a heating mechanism 120 that heats the blanket 116. The heated blanket 116 and the PIP 102 contact one another as they rotate, which transfers the ink from the PIP 102 to the heated blanket 116. The heated blanket 116 reduces the liquid content of the ink, rendering the ink as a sticky film on the blanket 116. The PIP 102 continues to rotate past a cleaning station 128, which removes any ink residue from the PIP 102 and prepares it for another rotation past the charge roller 106. The cleaning station 128 may include a wetting roller to wet the PIP 102, and a sponge and a wiper to then remove the wetted ink residue from the PIP 102, for instance.

The LEP printing device 100 includes an impression cylinder 121, or impression drum, which rotates clockwise as indicated by arrow 122. Rotation of the impression cylinder 121, together with rotation of the blanket 116, advances a print medium 124, like paper, in the direction indicated by arrow 126. The film of ink is transferred from the blanket 116 onto the medium 124 against the impression cylinder 121, as the medium 124 advances between the impression cylinder 121 and the blanket 116.

Figure 2:
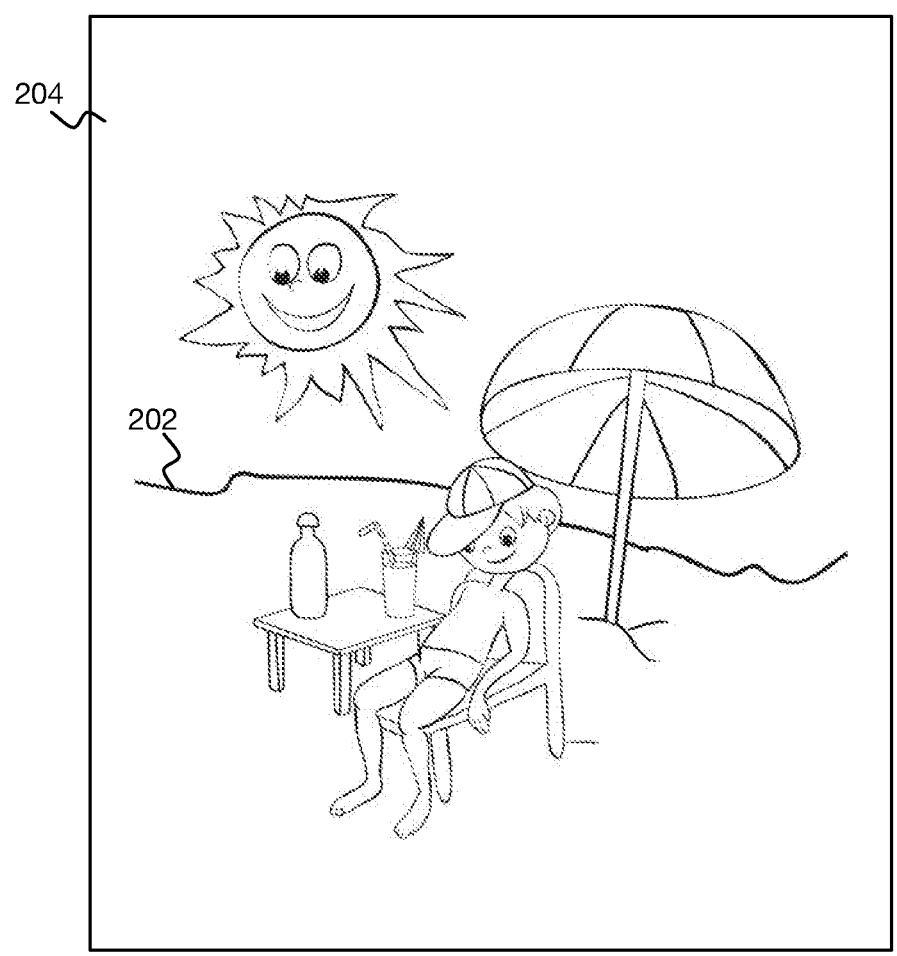
FIG. 2 is a diagram of an example image.

FIG. 2 shows an example image 200 that can be formed on the print medium 124 by the LEP printing device 100. The image 200 includes an image portion 202 and a background portion 204. The image portion 202 includes those parts of the image 200 corresponding to ink—that is, where the image 200 is actively printed on the print medium 124 by the printing device 100. By comparison, the background portion 204 includes those parts of the image 200 that do not correspond to ink—that is, where the image 200 is not actively printed by the device 100.

Figure 3:
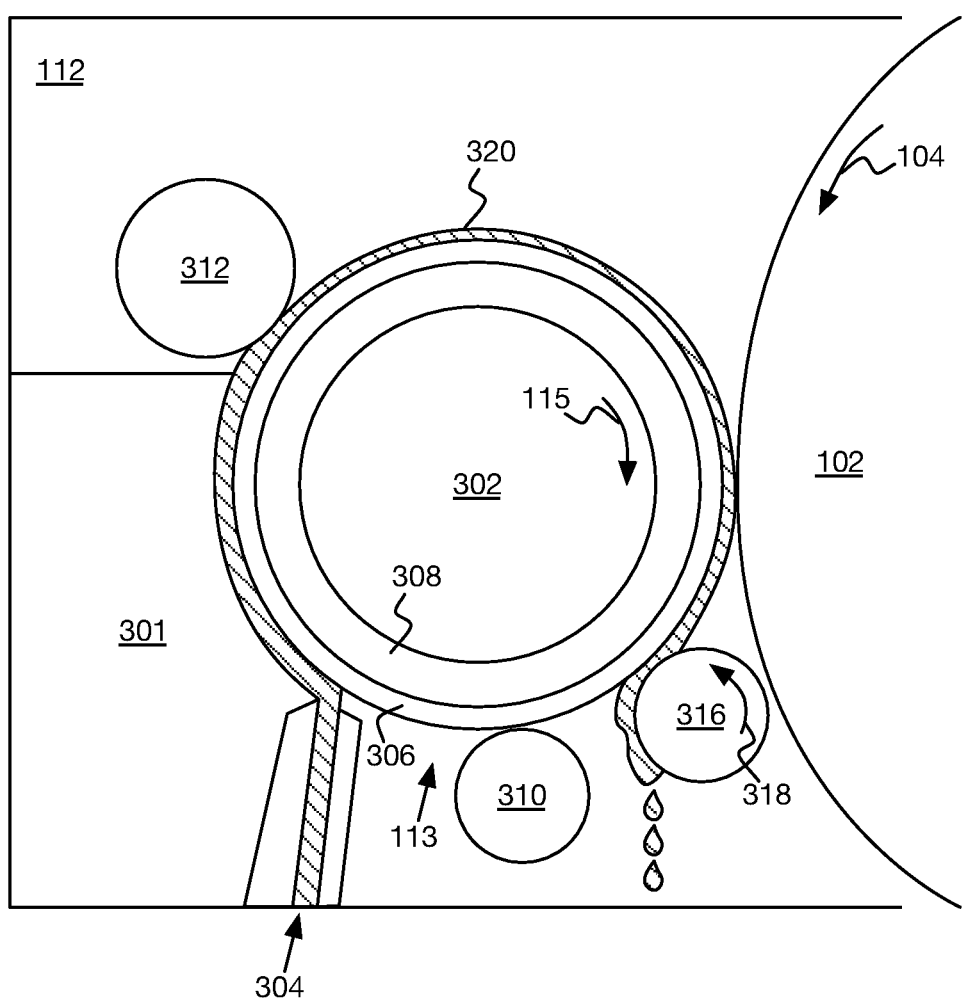
FIG. 3 is a diagram of an example binary ink developer (BID) assembly for an LEP printing device that can impose a charge-specific boundary condition on a developer roller of the BID assembly.

FIG. 3 shows the example BID assembly 112 of the LEP printing device 100. The developer roller 113 of the BID assembly 112 includes a conductive rubber roller 308 having a conductive core roller 302, and an electrical insulating exterior coating 306 around the roller 308. The developer roller 113 rotates clockwise as indicated by arrow 115. The exterior coating 306 can have a thickness between two or three microns and tens of microns, such as between ten and eighteen microns. More generally, the exterior coating 306 has a thickness in microns having an order of magnitude between zero and one. The exterior coating 306 may be fabricated from a poly (p-xylylene) polymer, or another material.

The BID assembly 112 includes a charger roller 310, which is not to be confused with the separate charge roller 106 for the PIP 102 in FIG. 1. The charge roller 310 is in contact with the electrically insulating exterior coating 306 and places a negative charge on the exterior coating 306 as the developer roller 113 rotates past the charge roller 310. Liquid ink 320 initially has a low percentage of solids, such as resins and pigments. The liquid ink 320 can include negatively charged ink particles and counter charges in the form of positive micelles. The liquid ink 320, which thus has a zero total charge, is pumped within a channel 304 of the BID assembly 112, resulting in the negatively charged ink particles and positively charged micelles to separate due to an electric field between an electrode 301 and the developer roller 113. As the developer roller 113 rotates past the electrode 301, the exterior coating 306 thus receives negatively charged ink 320. That is, the electrode 301 is said to plate the negatively charged ink 320 onto the exterior coating 306. The developer roller 113 continues to rotate towards a squeeze roller 312 of the BID assembly 112, which is in near contact with the exterior coating 306.

After receiving the liquid ink 320 on the electrically insulating exterior coating 306, the developer roller 113 rotates past the squeeze roller 312. The squeeze roller 312 reduces a thickness of the liquid ink 320 on the exterior coating 306, which reduces the liquid content of the ink. The squeeze roller 312 compacts the ink 320 both mechanically and electrostatically. For example, the liquid content of the ink 320 may be reduced from about 80% as initially plated onto the exterior coating 306 to about 75% after passing against the squeeze roller 312. The developer roller 113, with the reduced-thickness liquid ink 320 on its exterior coating 306, continues to rotate past the PIP 102 of the LEP printing device 100, which is rotating counterclockwise per the arrow 104.

The ink 320 is thus transferred to image portions 202 of the electrostatic image 200 formed on the PIP 102, as described above in relation to FIG. 1. The ink 320 is not transferred to the PIP 102 at background portions 204 of the image 200 because there is more negative charge on the PIP 102 than on the developer roller 113 and because the resulting electric field is directed towards the PIP 102. After transfer of the ink 320 from the electrically insulating exterior coating 306 to the PIP 102 in accordance with the electrostatic image 200 on the PIP 102, the developer roller 113 rotates past a cleaning roller 316, which rotates counterclockwise per arrow 318. The cleaning roller 316 removes (any) remaining ink 320 from the exterior coating 306, preparing the developer roller 113 for another rotation past the charge roller 310.

The inclusion of the charge roller 310 and the electrically insulating nature of the exterior coating 306 of the developer roller 113 of the BID assembly 112 minimize if not eliminate the unwanted transfer of ink 320 onto the PIP 102, particularly when the ink 320 is electrically conductive ink. Rather than electrically biasing a negative voltage on the developer roller 113, a charge roller 310 instead places negative charges on the electrically non-conductive surface of the exterior coating 306. If the developer roller 113 were instead biased with a negative voltage, and if the roller 113 lacked the electrically insulating exterior coating 306, induced positive charges may otherwise leak into the electrically conductive ink 320, resulting in "flipping" of the ink charge from negative to positive, and causing the ink 320 to transfer onto the PIP 102 at background portions 204 of the electrostatic image 200 on the PIP 102.

The rubber roller 308 of the developer roller 113 can be electrically conductive since it is not in direct contact with the ink 320 due to the presence of the exterior coating 306. That the roller 308 is rubber can provide a degree of flexibility or softness to the developer roller 113 of the BID assembly 112. Such flexibility or softness can lessen the potential for mechanical problems resulting when the exterior coating 306 makes contact with the PIP 102, particularly if the exterior coating 306 is itself a hard coating.

Figure 4A:
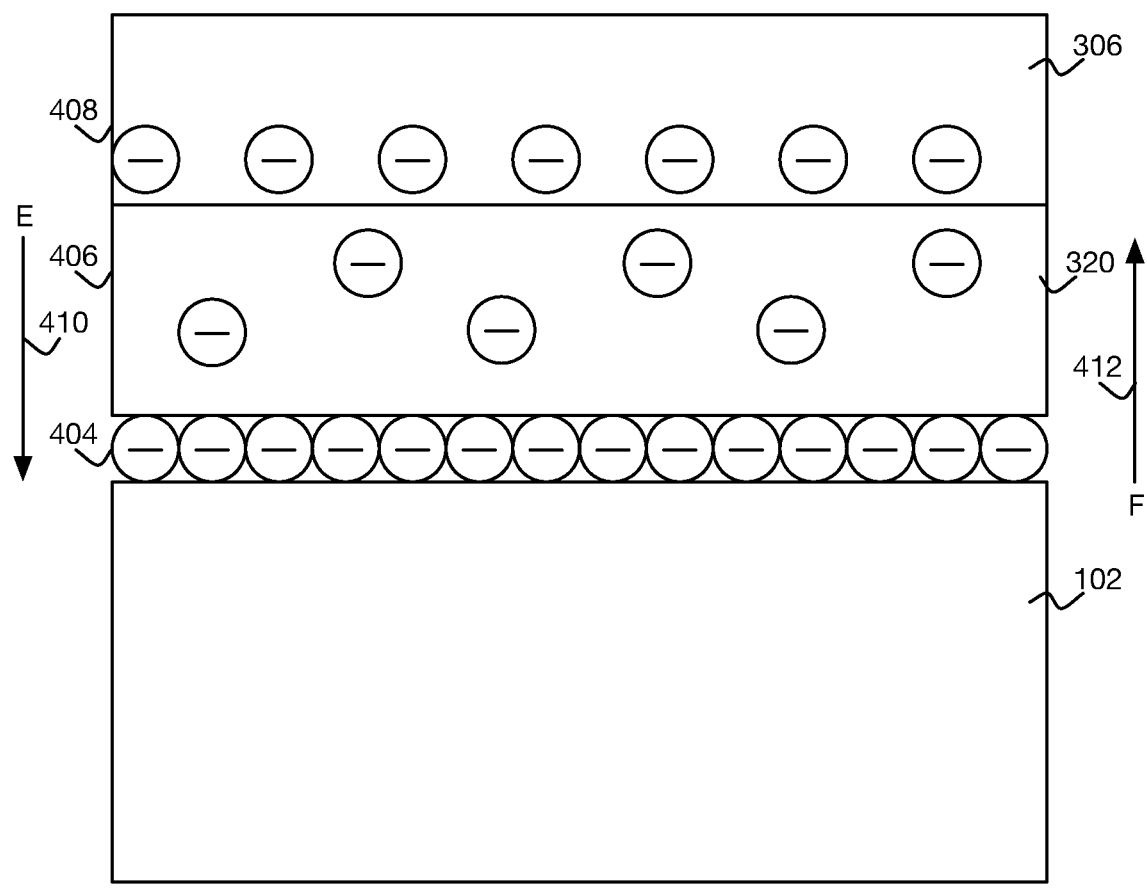
FIG. 4A is a diagram of an example of (negative) charge on an electrically insulating exterior coating of a developer roller of a BID assembly, a print-imaging plate (PIP) at a background portion of an electrostatic image, and electrically conductive ink on the exterior coating.

FIG. 4A shows an example of the electrostatic charge at a background portion 204 of an electrostatic image 200 formed on the PIP 102 in relation to the electrically insulating exterior coating 306 having a layer of electrically conductive ink 320, at the location in FIG. 3 at which the developer roller 113 is in contact with the PIP 102. FIG. 4A thus shows a charge-specified boundary condition at the boundary between the exterior coating 306 of the developer roller 113 of the BID assembly 112 and the ink 320. FIG. 4A shows the PIP 102 as to a background portion 204 of an electrostatic image 200 formed on the PIP 102 because the PIP 102 still has negative charge 404 placed by the charge roller 106 of FIG. 1. By comparison, an image portion 202 of the image 200 formed on the PIP 102 would not have any negative charge, because the PIP 102 is optically discharged at the image portion 202 of the image 200, which is subsequently in relation to FIG. 4B below.

The electrically insulating exterior coating 306 of the developer roller 113 has negative charge 408, placed by the charge roller 310 of FIG. 3. The developer roller 113 is not, in other words, biased with a negative voltage (and its exterior coating 306 is not electrically conductive). As such, electrostatically, the boundary condition between the ink 320 and the exterior coating 306 is a charged-specified electrostatic boundary condition, because the charge placed on the exterior coating 306 is specified (and maintained). The boundary condition is not a voltage-specified electrostatic boundary condition as would be the case if there were no exterior insulating coating 306 and biased with a specified negative voltage that is maintained.

The electrically conductive ink 320 has the negative charge 406 throughout its volume. Within FIG. 4A, there is no positive charge therefore; no positive charge can thus be transferred to the ink 320 within the BID assembly 112 that includes the exterior coating 306. By comparison, if the exterior insulating coating 306 were absent and the developer roller 113 instead biased with a negative voltage, the maintenance of a voltage-specified electrostatic boundary condition between the ink 320 and the developer roller 113 would result in a positive charge being induced at the exterior coating 306. Such positive charge could leak into the ink 320, because the ink 320 is conductive, resulting in the ink 320 transferring to the PIP 102 even at a background portion 204 of the electrostatic image 200, since the ink 320 would become positive and thus not repelled from the negative charge 406 on the PIP 102.

In FIG. 4A, a resulting electric field 410 is directed downwards, from the exterior coating 306 of the BID assembly 112 through the electrically conductive ink 320 and towards the PIP 102. This is because the charge on the exterior coating 306 is less dense than the charge on the PIP 102 at the background portion 202 of the image 200. A resulting electrostatic force 412 is thus directed upwards, from the PIP 102 towards the exterior coating 306. Therefore, the ink 320 remains on the exterior coating 306 and is not transferred to the PIP 102, since the electrostatic force 412 is directed upwards towards the exterior coating 306 and not downwards towards the PIP 102.

Figure 4B:
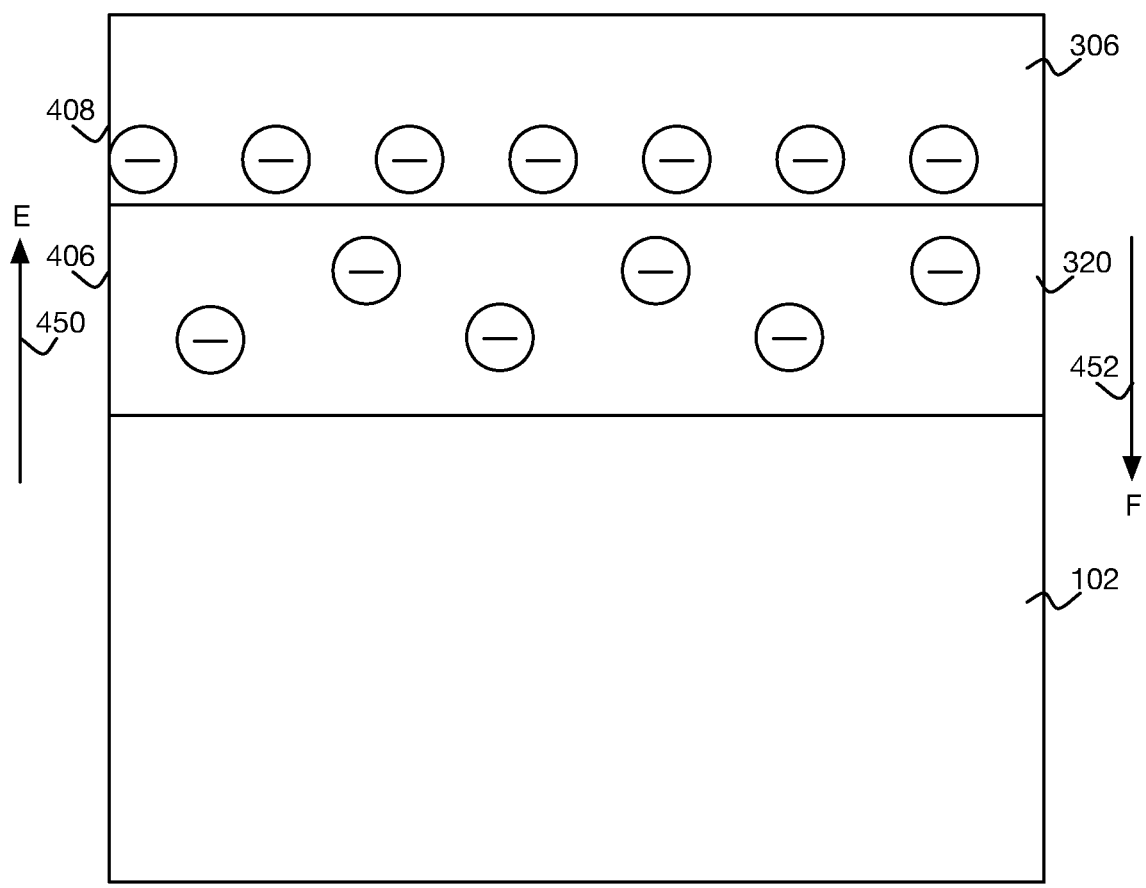
FIG. 4B is a diagram of an example of (negative) charge on an electrically insulating exterior coating of a developer roller of a BID assembly, a print-imaging plate (PIP) at an image portion of an electrostatic image, and electrically conductive ink on the exterior coating.

In comparison to FIG. 4A, FIG. 4B shows an example of the electrostatic charge at an image portion 202 of an electrostatic image 200 formed on the PIP 102 in relation to the electrically insulating exterior coating 306 having a layer of electrically conductive ink 320, at the location in FIG. 3 at which the developer roller 113 is in contact with the PIP 102. FIG. 4B thus shows a charge-specified boundary condition at the boundary between the exterior coating 306 of the developer roller 113 of the BID assembly 112 and the ink 320. FIG. 4B shows the PIP 102 as to an image portion 202 of an electrostatic image 200 formed on the PIP 102 because the PIP 102 no longer has negative charge placed by the charge roller 106 of FIG. 1. By comparison, a background portion 204 of the image 200 formed on the PIP 102 would have negative charge, because the PIP 102 is not optically discharged at the background portion 204 of the image 200, as previously described in relation to FIG. 4A.

The electrically insulating exterior coating 306 of the developer roller 113 again has negative charge 408, placed by the charge roller 310 of FIG. 3. As in FIG. 4A, the developer roller 113 is not, in other words, biased with a negative voltage (and its exterior coating 306 is not electrically conductive) in FIG. 4B. Therefore, electrostatically, the boundary condition between the ink 320 and the exterior coating 306 is in FIG. 4B a charged-specified electrostatic boundary condition, because the charge placed on the exterior coating 306 is specified (and maintained). The boundary condition is not a voltage-specified electrostatic boundary condition as would be the case if the exterior coating 306 were electrically conductive and biased with a specified negative voltage that is maintained.

The electrically conductive ink 320 also has negative charge 406 in FIG. 4B throughout its volume. As in FIG. 4A, within FIG. 4B there is no positive charge therefore; no positive charge can thus be transferred to the ink 320 within the BID assembly 112 that includes the exterior coating 306. In FIG. 4B, however, a resulting electric field 450 is directed upwards, from the exterior coating 306 of the developer roller 113 through the electrically conductive ink 320 and towards the PIP 102. This is because there is no charge on the PIP 102 at the image portion 202 of the image 200, while there is negative charge 408 on the exterior coating 306. A resulting electrostatic force 452 is thus directed downwards in FIG. 4A, from the exterior coating 306 towards the PIP 102. Therefore, the ink 320 is transferred from the exterior coating 306 to the PIP 102, since the electrostatic force 102 is directed downwards towards the PIP 102.

Figure 5:
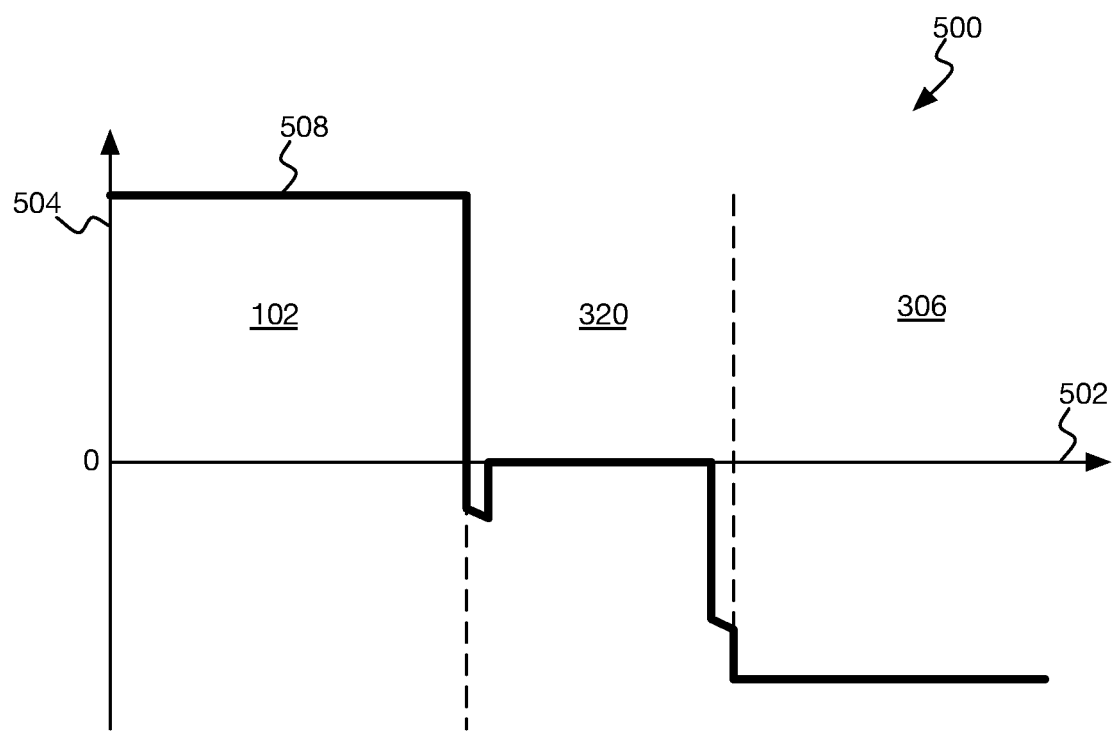
FIG. 5 is a diagram of an example graph of the electric field among an electrically insulating coating of a BID assembly, a PIP at a background portion of the electrostatic image, and electrically conductive ink on the exterior coating.

FIG. 5 shows an example graph 500 of the electric field in the scenario of FIG. 4, at a background portion 204 of an electrostatic image 200 formed on the PIP 102 in relation to the exterior coating 306 having electrically conductive ink 320, at the location in FIG. 3 at which the developer roller 113 is in contact with the PIP 102. The axis 502 of the graph 500 denotes distance, and is spatially divided into regions corresponding to the PIP 102, the ink 320, and the electrically insulating coating 306. The axis 504 of the graph 500 denotes the electric field, with a zero electric field (i.e., no electric field) specifically called out in FIG. 5.

A solid line 508 indicates the electric field among the PIP 102, the electrically conductive ink 320, and the electrically insulating exterior coating 306 of the BID assembly 112. The electric field is positive at the PIP 102, and at the boundary between the PIP 102 and the electrically conductive ink 320 decreases and becomes negative. This discontinuity of the electric field towards negative is a representation of negative surface charges on the PIP 102. Electrically conductive ink 320 can have a non-conductive portion that can have a charge, rendering charge to the ink 320 as a whole. The non-conductive portion can be a charged polymer that can be removed in a later part of the printing process. Within the electrically conductive portion of the electrically conductive ink 320 near the PIP 102, the electric field becomes zero, since this portion is electrically conductive. The non-conductive portion of the conductive ink 320 having charge can be distributed throughout the volume of the ink 320, such that the charge itself is distributed throughout the volume, causing the electrical field to slowly decrease (i.e., for a constant volume distribution, a linear decrease). At the boundary between the ink 320 and the electrically insulating exterior coating 306, the electric field exhibits another negative discontinuity that represents negative surface charge on the electrically insulating exterior coating 306 of the developer roller 113 of the BID assembly 112.

The solid line 508 therefore depicts that there is no enhancement of the electric field within the electrically conductive ink 320. By comparison, if there were no exterior insulating coating 306, and if the developer roller 113 were biased with a voltage in accordance with a voltage-specified electrostatic boundary condition, the electric field at the non-conductive portion of the conductive ink 320 would increase. This is because the imposed voltage-specific boundary condition specifies a higher electric field to compensate for the zero electric field within the conductive portion of the ink 320. This enhancement of the electric field can result in electrical breakdown of the non-conductive portion of the ink 320 as well as dielectric carrier fluids (e.g., isoparaffinic fluids) within the ink 320, and therefore, positively charge the ink 320. The resulting positively charged ink 320 can then transfer to the PIP 102 at the background portion 204 of the electrostatic image 200 on the PIP 102. As such, FIG. 5 demonstrates how placing charge on an electrically insulating exterior coating 306 of a developer roller 113, instead of biasing a voltage on a developer roller 113 that lacks an exterior coating 306 that is electrically insulating, can minimize, if not eliminate, electric field enhancement within electrically conductive ink 320. Minimizing or eliminating this electric field enhancement in turn reduces or eliminates transfer of the electrically conductive ink 320 to the PIP 102 at a background portion 204 of the image 200 electrostatically formed on the PIP 102.

Figure 6:
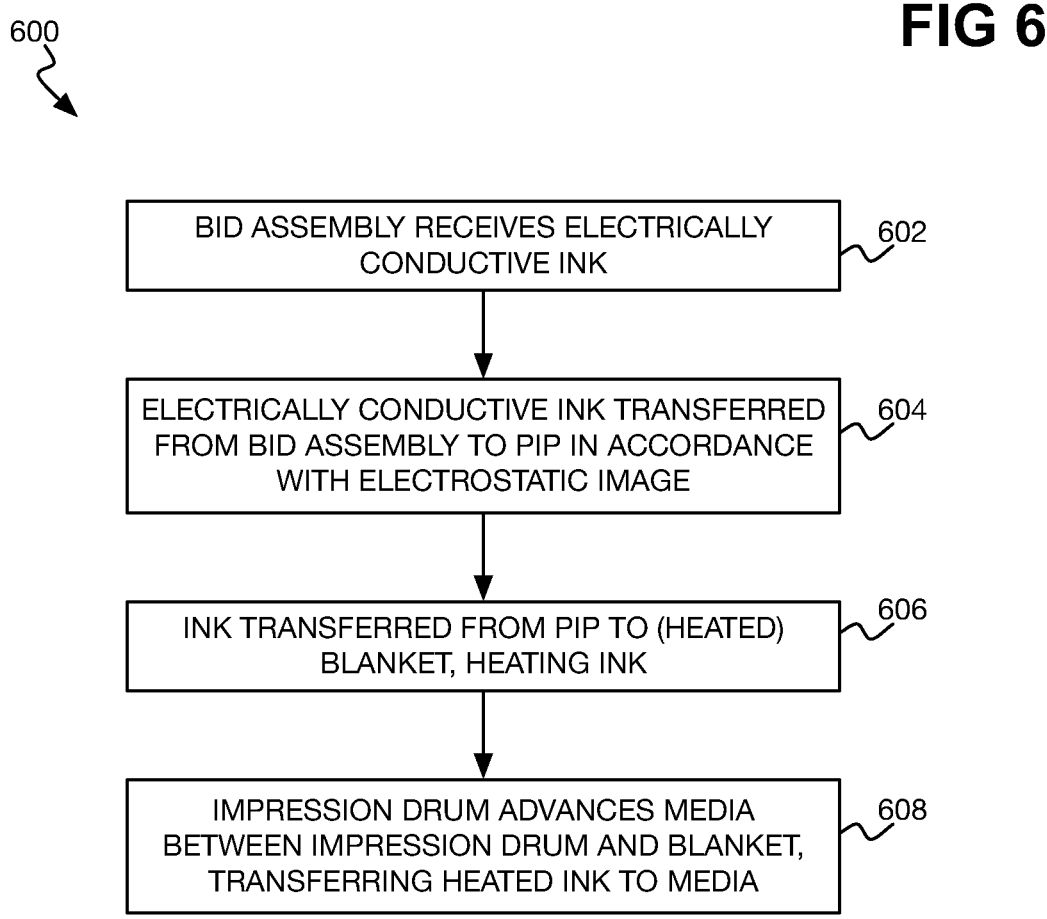
FIG. 6 is a flowchart of an example method for forming an imaging using an LEP printing device.

FIG. 6 shows an example method 600 for printing an image 200 on a print medium 124 using the LEP printing device 100. The electrically insulating exterior coating 306 of the developer roller 113 of the BID assembly 112 receives electrically conductive ink 320 (602). The ink 320 is transferred from the exterior coating 306 of the developer roller 113 of the BID assembly 112 to the PIP 102 in accordance with the electrostatic image 200 (604). As has been described, the ink 320 is transferred to the PIP 102 at image portions 202 of the image 200, and not to background portions 204 of the image 200. The ink 320 is then transferred from the PIP 102 to a heated blanked 116 (606). An impression cylinder 121 advances the media 124 between the cylinder 121 and the blanket 116, causing the heated ink 320 to be transferred from the blanket 116 to the media 124.

The invention claimed is:

1. A binary ink developer (BID) assembly for a liquid electrophotography printer (LEP), the BID assembly comprising:
   a developer roller that is rotatable and which comprises an electrically insulating exterior coating to receive ink from an ink supply and to transfer the received ink to a photoconductive imaging cylinder in accordance with an electrostatic image on the imaging cylinder, as the developer roller rotates; and
   a charge roller in contact with the electrically insulating exterior coating to place a specified polarity charge on the exterior coating prior to the exterior coating receiving the ink to control ink transfer from the exterior coating to the imaging cylinder.

2. The BID assembly of claim 1, wherein the specified polarity charge is a negative charge.

3. The BID assembly of claim 1, wherein the charge roller is to cause the specified polarity charge at a boundary between the exterior coating and the ink, upon providing of the ink to the exterior coating.

4. The BID assembly of claim 1, wherein the exterior coating is to maintain the placed specified polarity charge after receiving the ink.

5. The BID assembly of claim 1, wherein the charge roller and the electrically insulating exterior coating minimize increasing an electrical field within the ink, upon providing of the ink to the electrically insulating exterior coating.

6. The BID assembly of claim 1, wherein the electrically insulating exterior coating has a thickness specified as a number of microns, the thickness having an order of magnitude between zero and one.

7. The BID assembly of claim 1, further comprising:
   a squeeze roller in rotatable contact with the electrically insulating exterior coating to decrease a thickness of the ink received on the exterior coating prior to transfer of the received ink to the photoconductive imaging cylinder.

8. A liquid electrophotography (LEP) printing device comprising:
   a binary ink developer (BID) assembly to receive ink from an ink supply and comprising:
      a developer roller including an electrically insulating exterior coating to receive an electrically conductive ink; and
      a photoconductive imaging cylinder to which the developer roller of the BID assembly is to transfer the ink in accordance with an electrostatic image on the imaging cylinder; and a charge roller in contact with the electrically insulating exterior coating, at a location prior to the exterior coating receiving the ink, to place a specified polarity charge on the exterior coating to electrostatically charge the ink with the specified polarity charge.

9. The LEP printing device of claim 8, wherein the specified polarity charge is a negative polarity charge.

10. The LEP printing device of claim 9, wherein the specified negative polarity charge is to prevent ink transfer from the exterior coating to the imaging cylinder at non-discharged portions of the electrostatic image.

11. The LEP printing device of claim 8, wherein the BID assembly minimizes increasing an electrical field within the ink, upon providing of the ink to the BID assembly.

12. A method comprising:
arranging a charge roller in contact with an electrically insulating exterior coating of a developer roller of a binary ink developer (BID) assembly of a liquid electrophotography (LEP) printing device;
applying, via the charge roller, a specified polarity charge on the exterior coating;
receiving, after the charging, onto the exterior coating an electrically conductive ink while the exterior coating of the developer roller is in rotatable contact with a photoconductive imaging cylinder; and
transferring the received electrically conductive ink from the exterior coating of the developer roller to the imaging cylinder in accordance with an electrostatic image on the imaging cylinder, while inhibiting transfer of electrically conductive ink to the imaging cylinder at background portions of the electrostatic image.

13. The method of claim 12, comprising:
forming the electrostatic image by selectively discharging, via a laser, pre-charged portions of the imaging cylinder and defining the background portions as non-selectively discharged portions of the imaging cylinder.

14. The method of claim 12, wherein the specified polarity charge is a negative charge.

15. The method of claim 12, comprising:
causing, via the applying of the specified polarity charge and the receiving ink onto the exterior coating, a boundary condition at the boundary of the ink and the exterior coating, wherein the boundary condition comprises a negative charge.

16. The method of claim 15, comprising:
performing causation of the boundary condition independent of voltage-biasing the developer roller.

17. The method of claim 12, comprising:
after the transferring and after removing any residual ink from the exterior coating, performing the applying.

18. The BID assembly of claim 1, further comprising:
a cleaner roller in rotatable contact with the exterior coating to remove any residual ink from the exterior coating after the transfer of the received ink to the imaging cylinder, wherein the charger roller is interposed between the cleaner roller and a location at which the ink is received from the ink supply onto the exterior coating.

19. The BID assembly of claim 1, further comprising:
an electrode positioned adjacent the exterior coating and to cause the ink to be placed onto the exterior coating with a second specified polarity charge, which corresponds to a polarity of the first specified polarity charge placed by the charge roller, wherein the charge roller is located upstream from the electrode along the travel path of the exterior coating.

20. The BID assembly of claim 19, wherein the electrode is to place the ink with the second specified polarity charge onto the exterior coating, and the charge roller is to place the first specified polarity charge on the exterior coating, without negatively voltage-biasing a conductive core of the developer roller.

* * * * *